M. C. REGAN.
MOTOR CONTROLLING APPARATUS.
APPLICATION FILED FEB. 4, 1908.

901,189.

Patented Oct. 13, 1908.

3 SHEETS—SHEET 1.

Witnesses
Geo. A. Bepul.
W. Max. Durall

Inventor
M. C. Regan
By Wilkinson
Fisher & Wilkinson
Attorney

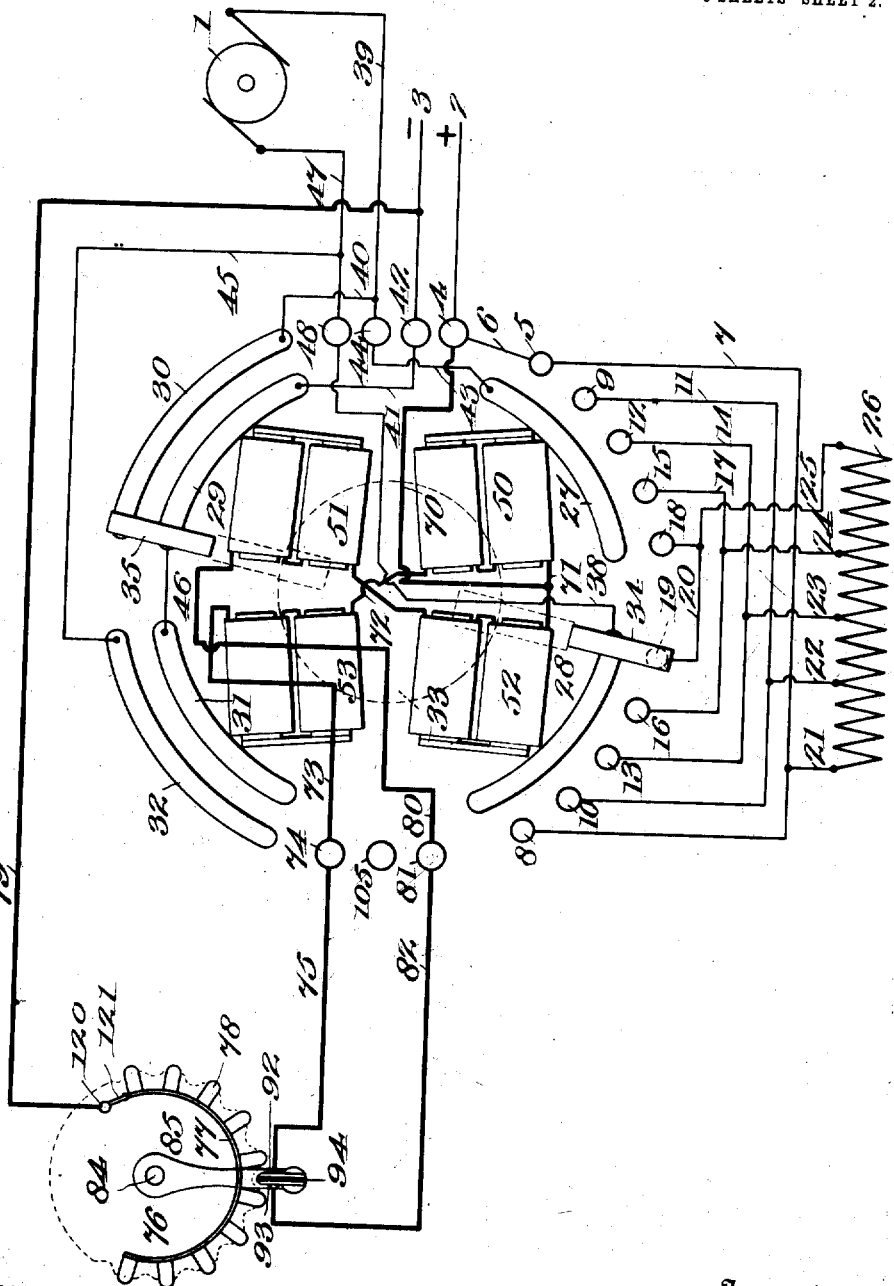

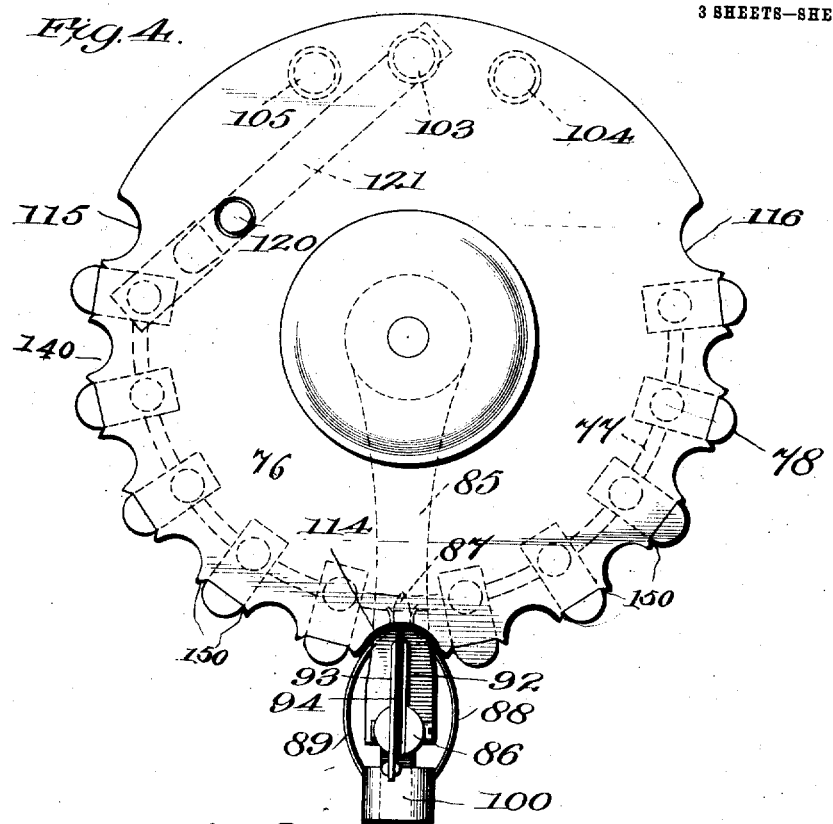
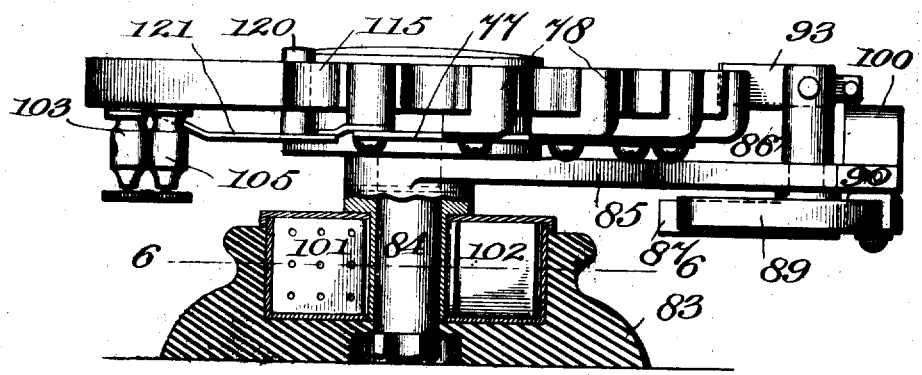
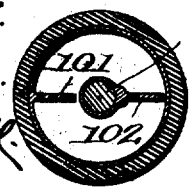

UNITED STATES PATENT OFFICE.

MICHAEL CHARLES REGAN, OF THE UNITED STATES ARMY.

MOTOR-CONTROLLING APPARATUS.

No. 901,188.          Specification of Letters Patent.          Patented Oct. 13, 1908.

Application filed February 4, 1908. Serial No. 414,273.

*To all whom it may concern:*

Be it known that I, MICHAEL CHARLES REGAN, United States Army, a citizen of the United States, residing at Fort Totten, in the county of Queens and State of New York, have invented certain new and useful Improvements in Motor-Controlling Apparatus; and I do hereby declare the following to be a full, clear, and exact description of the invention, such as will enable others skilled in the art to which it appertains to make and use the same.

My invention relates to a motor controlling apparatus, especially applicable to controlling motors from a distance and to search light control, and the object of my invention is to produce such a device which shall be simple in action, cheap to manufacture, not liable to get out of order, and which shall be capable of being operated from any desired distance.

To these ends my invention consists in the novel combinations of parts, and details of construction more fully hereinafter disclosed and particularly pointed out in the claims.

Figure 1:
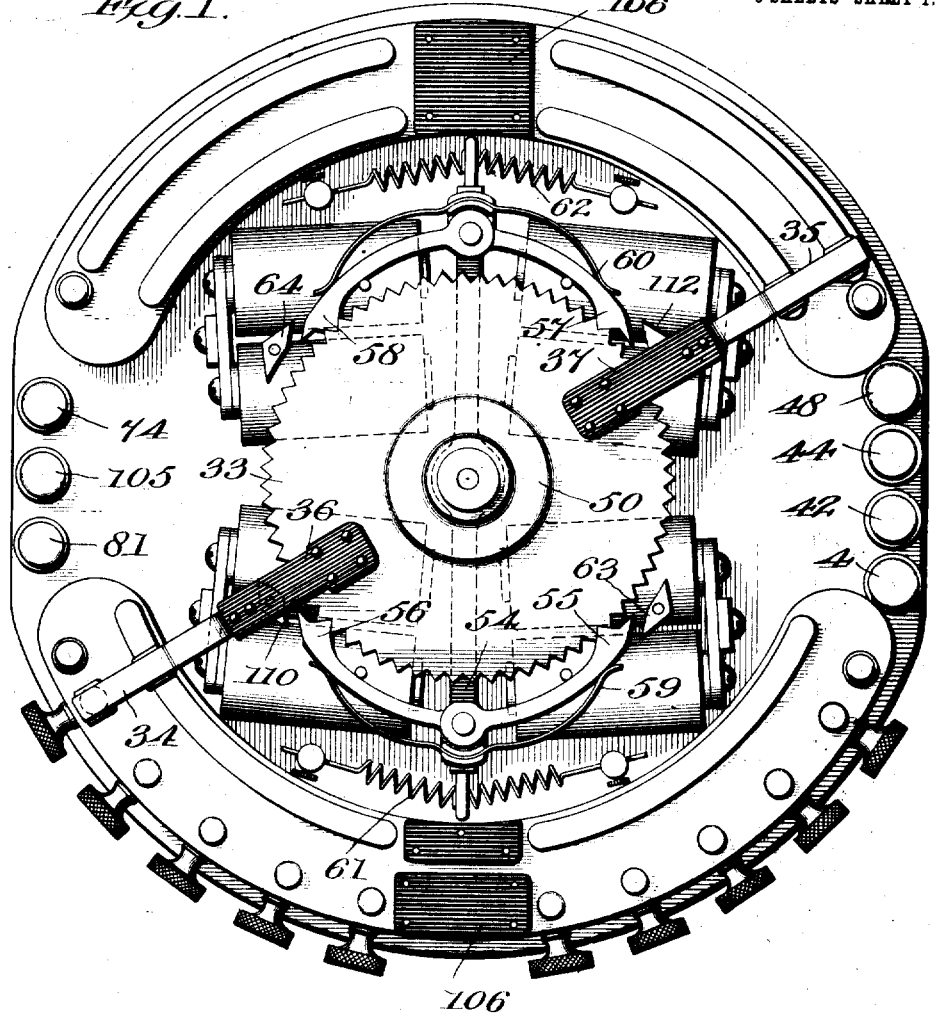
Figure 2:
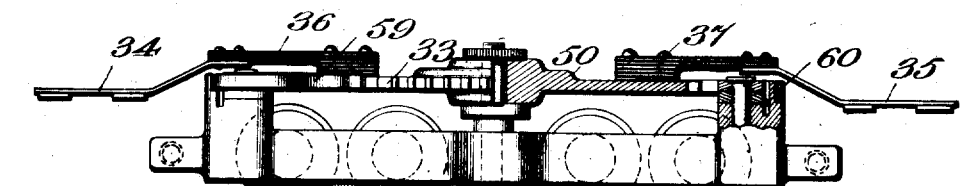

Referring to the accompanying drawings forming a part of this specification in which like numerals refer to like parts in all the views:—Figure 1, is a plan view of my resistance changing device, or rheostat. Fig. 2, a side elevation of the magnet controlled portions of my rheostat. Fig. 3, a diagrammatic view of my entire motor controller showing the circuits. Fig. 4, a plan view of my circuit closer, or contact maker. Fig. 5, a side elevation of the same partly in section showing my retarding means, and Fig. 6, a detail of the retarding means.

Referring more particularly to Fig. 3, 1, represents the motor or other device through which the current is to be increased, diminished or reversed at will; 2, the positive and 3, the negative supply main. The positive main leads to binding post 4, connected by wire 6, to contact 5, from which leads wire 7, to contact 8. In like manner contacts 9 and 10, are connected by wire 11, contacts 12 and 13 by wire 14, contacts 15 and 16 by wire 17, and contacts 18 and 19, by wire 20. The wires 7, 11, 14, 17 and 20, are connected in multiple to the resistance coil 26, by the wires 21, 22, 23, 24, and 25, respectively, as shown. 27, 28, 29, 30, 31 and 32, are elongated contacts adapted to be brought into various circuits and to be connected with the contacts first mentioned, as will appear more fully below. 33, represents a pivoted contact making disk carrying the contact making fingers 34 and 35, on the insulating supports 36 and 37. The finger 34, is adapted to make circuit with each of the contacts 5, 9, 12, 15, 18, 19 etc., and to join the same with one or the other of contacts 27 and 28. When it is making circuit with contact 19, as shown, it closes the circuit between said contact and the elongated contact 28, while at the same time finger 35, closes the circuit between the elongated contacts 29 and 30. When these fingers are in the positions just described, the current will flow from the positive main 2, through binding post 4, wire 6, contact 5, wires 7 and 21, coil 26, wires 25 and 20, contact 19, finger 34, contact 28, wire 38, post 48, wire 47, to and through motor 1, by wire 39 to wire 40, elongated contact 30, finger 35, contact 29, wire 41, to negative main binding post 42.

In the position of finger 34, shown, all the resistance of coil 26, is in circuit, and therefore the motor will get less current, than when the finger is moved to contact 16, or to contact 13. In other words, as the finger is moved to the left, as shown in Fig. 3, the resistance 26, is continually cut out and the motor speeds up until the finger reaches contact 8, when all the resistance 26, is cut out.

When the finger is moved to the right, so as to make circuit with contact 18, the current passes as before from the positive binding post 4, to the said contact 18, through the finger 34, to the elongated contact 27, through the wire 43, to binding post 44, through wire 39, to and through the motor 1, by way of wire 47, to wire 45, contact 32, finger 35, contact 31, wire 46, contact 29, and wire 41, to negative post 42. The current in this instance traverses the motor in a direction opposite to that first described and the motor will accordingly be reversed. In the same way, a further movement of the finger 34, to the right will continually cut out resistance, and speed up the motor, as is apparent from the connections shown in Fig. 3. When the fingers 34 and 35, are mid way between the contacts 27 and 28, and the contacts 30 and 32 respectively, then the circuit is broken and the motor cut out. The movements of the fingers 34 and 35, just described to start, stop, speed up and reverse the motor may be done by hand, by simply rotating said fingers in any suitable manner, but I prefer a magneto mechanism for accomplishing this rotation from a distance. This mechanism consists of the electro magnets 50, 51, 52 and 53, provided with the armature lever 54, carrying at one end the pawls 55 and 56, and at the other end the pawls 57 and 58, as shown. Double springs 59 and 60, are provided for these pawls, and returning springs 61 and 62, are provided at the ends of the armature lever 54. Momentum, or overthrow pivoted stops 63 and 64, are provided on the frame to lock the pawls in the ratchet teeth, 65, with which the disk 33, is provided, and to thereby prevent the said disk from turning too far under the influence of its momentum when the pawls are given a violent and sudden forward impulse.

Returning again to Fig. 3, it will be observed that the current may flow through the wire 70, from the positive binding post to the wire 71, thence through the coils of magnet 50, to the wire 72, thence through the coils of magnet 53, to the wire 73, binding post 74, wire 75, to the controller 76, to be presently described, one of the contacts 78 and wire 79, of said controller, to wire 79, and back to the negative main 3.

In traversing the coils of magnets 50 and 53, the current causes the armature lever to be thrown sharply to the right, and the pawls 55 and 58, to turn the disk 33, and the fingers 34 and 35, also to the right. When, however, a different kind of contact is made at the controller 76, the current will reach the wire 71, as before, pass through the coils of magnets 52 and 51, by way of the wire 80, post 81, wire 82, a contact 78, on the controller and wires 77 and 79, back to the negative main, thereby causing the armature to be turned in an opposite direction, and the disk 33 and fingers 34 and 35, to also be turned in a direction opposite from that just described. In other words, the motor is by this magnetic means started, stopped or reversed from a distance through precisely the same circuits as those described above.

In order to make clear the full operation, I will now describe the construction of my controller 76. This controller consists of a base 83, through which passes the spindle 84, carrying the arm 85, having in its outer end the pin 86. This pin is provided at one end with the finger 87, on each side of which are the leaf springs 88 and 89, secured to the extreme end 90, of the arm 85, as shown in Figs. 4 and 5. The other end of the pin 86, is provided with a finger composed of two conducting strips 92 and 93, separated by the insulation 94, as shown. The wire 75, is connected to the strip 92, and the wire 82, to the strip 93, as best shown in Fig. 3.

Above the arm 85, is the disk of the controller 76, and surrounding the same are the individual contacts 78, all joined in multiple with the wire 77. Between each pair of these contacts 78, is a notch 140 in the periphery of the disk, into which the end of the two insulated strips enters, and against the sides of which one or the other of said strips strikes when the arm 85, is turned. That is to say, if the arm 85, as seen in Fig. 3, is turned to the right the strip 92, will continually make and break circuit with the contacts 78, and if it is turned to the left, the strip 93, will likewise continually make and break circuit with said contacts. When the arm 85, is turned, therefore, in one direction, the magnets 50 and 53, will be energized, the disk 33, forced to turn under the impelling force of the pawls carried by the armature lever 54, and the contact fingers 34 and 35, will close the circuit through the motor 1, and gradually speed it up, all as above set forth. And when the arm 85, is turned in the other direction, the disk 33, will be turned in a reverse direction and the fingers 34 and 35, will so change the circuits as to reverse the motor, in the manner already described. When the arm 85, is turned in either direction, it causes the strip 92 or 93, to strike against the wall of one of the notches 140 or 150 in the periphery of the disk, or against one of the contacts 78, as above stated, and this causes the pin 86, to turn on its axis, and thereby throws the finger 87, against one or the other of the leaf springs 88 or 89, thus putting the same under tension. The effect of this is to restore said finger and consequently the strips 92 and 93, to their normal position out of circuit with the contacts 78, as soon as the arm 85, is no longer moved. I preferably provide a finger piece 100, of suitable material, for moving the arm 85.

In order to prevent the arm 85, from being moved too rapidly and thereby injuring the motor, I provide a chamber in the base 83, adapted to contain a suitable fluid, and having a perforated diaphragm 101. Suitably attached to the spindle 84, and to said arm, is the revolving wing 102, adapted to force said fluid through the perforations of said diaphragm, as the arm is turned, and to thereby retard the motion of said arm.

In the finished machine, I provide the post 103, for the wire 79, the post 104, for the wire 75, and the post 105, for the wire 82, and any suitable connections are made from these posts to their corresponding parts. The post 105, is also for the wire 79.

Insulating pieces 106, are provided for the fingers 34 and 35, when in their mid position.

The operation will be clear from the foregoing, but may be briefly summarized as follows:—As the arm 85, is turned in one direction, it causes the magnets 50 and 53, to be energized, and the fingers 34 and 35, to close circuit through the motor, and when the said arm is turned in an opposite direction it causes the magnets 51 and 52, to be energized, and the current to be reversed through the motor. The dash pot device 101, 102, prevents the arm from being operated too suddenly, and the stops 63, 64, 110, 112, prevent the pawls from throwing the disk 33, too far, when violently operated. These stops serve to wedge the pawls in between the ratchet teeth and thereby to suddenly check the forward motion, while they do not prevent the pawls from being withdrawn. The springs 61, 62, serve to keep the armature lever 54, always in its mid position.

The notches 114, 115 and 116, in the disk of the controller 76, are preferably made deeper than the others, as best shown in Fig. 4, and the strips 92 and 93, are made of such a length that when they occupy said notches the arm 85, may be turned in either direction, but when they occupy any other notches the bar can only continue to turn in that direction in which it started. To insure this result the smaller notches 150 are provided. These notches are located immediately on each side of the strips 78, and serve to prevent the strips 92 and 93 from being returned to a notch 140, after contact has once been made between one of said strips 92 or 93, and one of said strips 78. The effect of this construction is to enable the operator to start the motor in either direction from the notch 114, but when once started, the contact fingers 34 and 35, must continue on in the same direction, until all the resistance is cut out, and must then come back over the same course when they occupy their mid position. The operator at the switch controller is thus compelled to make a complete stroke, and since the retarding means coupled with the above complete stroke devices, keeps the distant resistance controlling devices in step, as well as prevents the motor from being started too suddenly, mistakes are avoided.

The push button 120, controlled by the spring 121, serves to break the circuit whenever it is desired to move the arm 85, without operating the motor, or whenever, for any other purpose, it is desired to cut off the current from the controller.

Of course I do not wish to be understood as limiting my invention to the exact details of construction and operation of parts above described, for it is evident that they may be varied without departing from the spirit of my invention.

What I claim is:—

1. In a motor controlling apparatus, the combination of a series of contacts; a resistance joined in multiple therewith; an elongated contact; a finger adapted to close circuit between said latter contact and each of said first mentioned contacts; a second and a third elongated contact; a second finger adapted to close circuit between said latter pair of contacts; a disk supporting said fingers; a pawl to actuate said disk; a magnet to actuate said pawl; a momentum stop for said pawl; a switch controller located at a distant point, and connections whereby the same is adapted to energize said magnet and to thereupon cause said fingers to close a circuit through said motor, substantially as described.

2. In a motor controlling apparatus, the combination of two series of contacts; a resistance joined in multiple with each contact in each series; an elongated contact for each series; a finger adapted to close circuit between each contact and its corresponding elongated contact; two pairs of other elongated contacts, one for each series; a second finger adapted to close circuit between the elongated contacts in each pair; insulating supports for each of said fingers; and magnetic means whereby said fingers may be made to traverse their respective contacts from a distant point, substantially as described.

3. In a motor controlling apparatus, the combination of two series of contacts; a resistance joined in multiple with each contact in each series; an elongated contact for each series; a finger adapted to close circuit between each contact and its corresponding elongated contact; two pairs of other elongated contacts, one for each series; a second finger adapted to close circuit between the elongated contacts in each pair; insulating supports for each of said fingers; and magnetic means consisting of magnets, an armature for the same, pawls, a ratchet, a switch controller located at a distant point and suitable connections whereby said fingers may be made to traverse their respective contacts, substantially as described.

4. In a motor controlling apparatus, the combination of two series of contacts; a resistance joined in multiple with each contact in each series; an elongated contact for each series; a finger adapted to close circuit between each contact and its corresponding elongated contact; two pairs of other elongated contacts, one for each series; a second finger adapted to close circuit between the elongated contacts in each pair; insulating supports for each of said fingers; a set of magnets; an armature for the same; pawls carried by the armature; a ratchet carrying said supports operated by said pawls, momentum stops for said pawls and ratchet; a controller located at a distant point, and suitable connections between said controller and said magnets, substantially as described.

5. In a motor controlling apparatus, the combination of two series of contacts; a resistance joined in multiple with each contact in each series; an elongated contact for each series; a finger adapted to close circuit between each contact and its corresponding elongated contact; two pairs of other elongated contacts, one for each series; a second finger adapted to close circuit between the elongated contacts in each pair; insulating supports for each of said fingers; two sets of magnets; a common armature lever for both sets; pawls carried by said lever; a ratchet carrying said supports and operated by said pawls; momentum stops for said pawls and ratchet; a controller provided with an arm 85; contact strips 92 and 93, carried by said arm; contacts 78, with which said strips are adapted to engage one at a time; and suitable connections between said magnets and said controller, whereby said arm 85, may be operated at will, substantially as described.

6. In a motor controlling apparatus, the combination of two series of contacts; a resistance joined in multiple with each contact in each series; an elongated contact for each series; a finger adapted to close circuit between each contact and its corresponding elongated contact; two pairs of other elongated contacts, one for each series; a second finger adapted to close circuit between the elongated contacts in each pair; insulating supports for each of said fingers; two sets of magnets; a common armature lever for both sets; pawls carried by said lever; a ratchet carrying said supports and operated by said pawls; momentum stops for said pawls and ratchet; a controller provided with an arm 85; contact strips 92 and 93, carried by said arm; shallow and deep notches on said controller in which said strips operate and which compel the same to make a complete stroke before reversing; contacts on each side of said shallow notches with which said strips engage one at a time; and suitable connections between said magnets and said strips whereby the operation of said arm 85, may be controlled at will, substantially as described.

7. In a motor controlling apparatus, the combination of suitable magnetic means for controlling the direction and quantity of current, with a controller located at a distant point for controlling said means and comprising a dash pot, an operating arm, a finger 87, carried by said arm, springs controlling said finger, contact strips insulated from each other also carried by said arm, a disk provided with shallow and deep notches into which said strips enter, contacts on each side of said notches, and suitable connections between said controller and said magnetic means, substantially as described.

8. In a motor controlling apparatus, the combination of suitable magnetic means for controlling the direction and quantity of current, with a controller located at a distant point for controlling said means and comprising an operating arm, contact strips insulated from each other carried by said arm, a disk provided with shallow and deep notches into which said strips enter, contacts on each side of said notches, and suitable connections between said controller and said magnetic means, substantially as described.

In testimony whereof, I affix my signature, in presence of two witnesses.

MICHAEL CHARLES REGAN.

Witnesses:
  WM. BORCHDUFF,
  GEO. A. INGERSOLL.